United States Patent
Oita et al.

(10) Patent No.: US 7,595,830 B2
(45) Date of Patent: Sep. 29, 2009

(54) IMAGING DEVICE WITH NORMAL AND REDUCED SENSITIVITY READOUT

(75) Inventors: Masaya Oita, Daito (JP); Hiromichi Tanaka, Daito (JP); Masafumi Kimata, Kusatsu (JP)

(73) Assignee: Funai Electric Co., Ltd., Daito-shi (JP)

(*) Notice: Subject to any disclaimer, the term of this patent is extended or adjusted under 35 U.S.C. 154(b) by 532 days.

(21) Appl. No.: 11/553,577

(22) Filed: Oct. 27, 2006

(65) Prior Publication Data
US 2007/0120982 A1    May 31, 2007

(30) Foreign Application Priority Data
Oct. 27, 2005    (JP) ............... 2005-312867

(51) Int. Cl.
H04N 5/217    (2006.01)
H04N 5/21    (2006.01)
H04N 5/225    (2006.01)

(52) U.S. Cl. ............... 348/308; 348/222.1; 348/226.1; 348/227.1; 348/228.1; 348/229.1

(58) Field of Classification Search ............... 348/226.1
See application file for complete search history.

(56) References Cited

U.S. PATENT DOCUMENTS

| | | | |
|---|---|---|---|
| 6,043,478 A * | 3/2000 | Wang | 250/208.1 |
| 6,930,716 B2 | 8/2005 | Yoshida | |
| 7,411,169 B2 * | 8/2008 | Mann | 250/208.1 |
| 2004/0069930 A1 * | 4/2004 | Zarnowski et al. | 250/208.1 |
| 2005/0185077 A1 * | 8/2005 | Xiao | 348/302 |
| 2006/0027843 A1 * | 2/2006 | Ogura et al. | 257/291 |
| 2006/0267052 A1 * | 11/2006 | McKee | 257/290 |
| 2008/0179633 A1 * | 7/2008 | Koizumi | 257/225 |

FOREIGN PATENT DOCUMENTS

| | | | |
|---|---|---|---|
| EP | 1017106 A2 * | 7/2000 | |
| EP | 1 677 522 A1 | 7/2006 | |
| JP | 2000-165754 A | 6/2000 | |
| JP | 2003-134396 A | 5/2003 | |
| JP | 2004-282552 A | 10/2004 | |
| JP | 3636291 B2 | 1/2005 | |
| JP | 2005-117101 A | 4/2005 | |

OTHER PUBLICATIONS

Mori, et al. "¼-Inch 2-Mpixel MOS Image Sensor with 1.75 Transistors/Pixel." IEEE Journal of Solid-State Circuits. Dec. 2004. 39:12; 2426-2430.*

* cited by examiner

Primary Examiner—David L Ometz
Assistant Examiner—Dwight Alex C Tejano
(74) Attorney, Agent, or Firm—Crowell & Moring LLP

(57) ABSTRACT

In an imaging device having an all-pixel read mode for reading signals from all pixels and a pixel downsampling read mode for reading signals by appropriately discarding pixels, adjacent ones of pixels use a floating diffusion capacitance, an amplifying transistor, a reset switch and a selection switch in common. In the pixel downsampling read mode, not only a primary capacitance but also a photodiode in each pixel to be discarded are used as capacitances for storing signal charges transferred from transfer switches. This makes it possible to lower the gate voltage of the amplifying transistor as compared with the case of using only the primary capacitance as a capacitance for storing signal charges transferred from a transfer switch to reduce the sensitivity of the pixels, thereby reducing the occurrence of flicker.

3 Claims, 11 Drawing Sheets

FIG.18

☐ PIXELS USING COMPONENTS IN COMMON OTHER THAN TRANSFER SWITCHES

○ PIXEL TO BE READ

PIXELS USING COMPONENTS IN COMMON OTHER THAN TRANSFER SWITCHES

PIXEL TO BE READ

IMAGING DEVICE WITH NORMAL AND REDUCED SENSITIVITY READOUT

BACKGROUND OF THE INVENTION

1. Field of the Invention

The present invention relates to an imaging device with reduced occurrence of flicker.

2. Description of the Related Art

Various studies have been made for an imaging device, particularly for a method of reading signals therein. For example, Japanese Laid-open Patent Publication 2000-165754 discloses a signal reading method for the purpose of increasing dynamic range. FIG. 1 and FIG. 2 correspond to FIG. 12 and FIG. 13 of the Patent Publication, respectively, which are a diagram of a pixel circuit of the fourth example described therein, and a timing chart showing the operation of the pixel circuit. The purpose of this signal reading method is not to reduce the occurrence of flicker, but to increase dynamic range as described above. However, since this method can be applied to reduce the occurrence of flicker under the illumination of a fluorescent lamp, this method will be described below as an example of a prior art.

FIG. 1 is a circuit diagram of a pixel circuit in a CMOS (Complementary Metal Oxide Semiconductor) image sensor applied to the conventional imaging device which has two transfer switches, i.e. a first transfer switch (transfer transistor) MTX1 and a second transfer switch (transfer transistor) MTX2, for one pixel. The pixel circuit has a floating diffusion capacitance CFD1 between the first transfer switch MTX1 and the second transfer switch MTX2 as well as a floating diffusion capacitance CFD2 between the second transfer switch MTX2 and a source-follower amplifying transistor MSF. In FIG. 1, reference symbols PD, MRES and MSEL designate a photodiode, a reset switch (reset transistor) and a selection switch (selection transistor), respectively.

This pixel circuit is designed to be able to switch a capacitance to be connected to the gate of the amplifying transistor MSF, between either a parallel connection of the capacitances CFD1, CFD2 or only the capacitance CFD2, under the control of a signal of a gate voltage $\phi_{TX2}$ applied to the transfer switch MTX2 as shown in FIG. 2 which is a timing chart showing an operation of the conventional pixel circuit. In FIG. 1 and FIG. 2, other reference symbols $\phi_{RES}$, $\phi_{TX1}$ and $\phi_{SEL}$ designate gate voltages of the reset switch MRES, transfer switch MTX1 and selection switch MSEL, respectively, while reference symbol OUT designates an output voltage (output signal) from the pixel circuit. In FIG. 2, furthermore, other reference symbols $R_{(P)}$, $R_{(C)}$, $R_{R(C1, C2)}$, $R_{R(C2)}$, CT, $R_{S(C1, C2)}$ and $R_{S(C2)}$ designate a reset point of the pixel (photodiode) at which the photodiode PD starts charge accumulation, a reset period of the pixel, a reset level reading period of the capacitances CFD1+CFD2, a reset level reading period of the capacitance CFD2, a charge transfer period, a signal level reading period of the capacitances CFD1+CFD2 and a signal level reading period of the capacitance CFD2, respectively.

Photogenerated carriers accumulated in the photodiode PD are divided and transferred to the capacitances CFD1, CFD2, because the gate voltage $\phi_{TX1}$ of the first transfer switch MTX1 is brought to a high level when the gate voltage $\phi_{TX2}$ of the second transfer switch MTX2 is at a high level. Thereafter, the gate voltage $\phi_{TX1}$ of the first transfer switch MTX1 is brought to a low level so as to read a signal based on photogenerated carriers stored in the capacitances CFD1, CFD2. Assuring that the voltage applied at this time to the gate of the amplifying transistor MSF is $V_{FD2}$, and the amount of charge of the photogenerated carriers is $Q_{PD}$, the voltage $V_{FD2}$ can be expressed by:

$$V_{FD2} = Q_{PD}/(C_{FD1}+C_{FD2})$$

where $C_{FD1}$ and $C_{FD2}$ are values of the capacitances CFD1, CFD2.

Next, charge having been stored in the capacitance CFD1 is transferred to the capacitance CFD2, and thereafter the gate voltage $\phi_{TX2}$ of the second transfer switch MTX2 is brought to a low level, so as to read a signal based on the photogenerated carriers stored in the capacitance CFD2. A voltage $V_{FD2H}$ applied at this time to the gate of the amplifying transistor MSF can be expressed by:

$$V_{FD2H} = Q_{PD}/C_{FD2}.$$

A comparison between the voltages $V_{FD2}$ and $V_{FD2H}$ indicates that the former $V_{FD2}$ is lower than the latter $V_{FD2H}$ because of the capacitance value $C_{FD1}$ in the denominator, meaning that the former $V_{FD2}$ causes a lower sensitivity.

As will be described below, the occurrence of flicker can be reduced by selectively using the two voltages $V_{FD2}$, $V_{FD2H}$ depending on required sensitivity. In normal brightness mode where an image received by the imaging device (specifically, photodiode) is in a normal brightness range, flicker is unlikely to occur. In this normal brightness mode, the imaging device is likely to be able to normally operate (e.g. produce an accurate or high fidelity image) even if the photodiode has a normal or long charge accumulation time (e.g. longer than a half period of a commercial AC power supply) with a normal or high pixel sensitivity. Thus, in the normal brightness mode, the imaging device uses a signal based on the voltage $V_{FD2H}$ (higher than the voltage $V_{FD2}$), which is applied to the gate of the amplifying transistor MSF with only the capacitance CFD2 storing charge, so as to cause the pixel sensitivity to stay normal or high.

On the other hand, in high brightness mode where an image received by the imaging device is in a high brightness range, flicker is likely to occur. In this high brightness mode, the imaging device is unlikely to be able to normally operate if the photodiode has a normal or long charge accumulation time (e.g. longer than a half period of a commercial AC power supply) with a normal or high pixel sensitivity. Thus, in the high brightness mode, the imaging device uses a signal based on the voltage $V_{FD2}$ (lower than the voltage $V_{FD2H}$) applied to the gate of the amplifying transistor MSF with both capacitances CFD1, CFD2 dividedly storing charge, so as to cause a lower pixel sensitivity, thereby achieving reduction of occurrence of flicker even with the normal or long charge accumulation time.

However, the imaging device according to the Japanese Laid-open Patent Publication 2000-165754 as described above requires two capacitances CFD1, CFD2 together with two transfer switches MTX1, MTX2 for one pixel. This is a problem because it causes the circuit structure to be complicated, thereby increasing the manufacturing cost of the imaging device.

SUMMARY OF THE INVENTION

It is an object of the present invention to provide an imaging device with reduced occurrence of flicker that can change the pixel sensitivity with an inexpensive and simple circuit structure without adding special circuit elements.

According to the present invention, this object is achieved by an imaging device comprising: a pixel circuit comprising:

multiple pixels each having a photoelectric conversion unit and transfer means for transferring signal charges output from the photoelectric conversion units; capacitance means for storing the signal charges transferred from the transfer means; signal amplifying means for amplifying and outputting signals corresponding to the signal charges stored in the capacitance means; reset means for resetting the signal charges stored in the capacitance means; and pixel selection means for selecting each pixel to read a signal from, wherein the imaging device has an all-pixel read mode for reading signals from all the pixels and a pixel downsampling read mode for reading signals of pixels by discarding the others.

In the imaging device, adjacent ones of the pixels use the capacitance means, the signal amplifying means, the reset means and the pixel selection means in common.

In the pixel downsampling read mode, not only the capacitance means but also the photoelectric conversion units of pixels to be discarded are used as capacitances for storing the signal charges transferred from the transfer means so as to lower voltage applied to the amplifying transistor as compared with the case of using only the capacitance means as a capacitance for storing signal charges transferred from the transfer means, thereby reducing sensitivity of the pixels.

Thus, in the imaging device according to the present invention, adjacent ones of the pixels use the capacitance means, the signal amplifying means, the reset means and the pixel selection means in common, so that the imaging device can be simplified in structure and reduced in manufacturing cost. Further, in contrast to the imaging device disclosed e.g. in Japanese Laid-open Patent Publication 2000-165754, it is not necessary to provide two capacitances and two transfer switches in one pixel, thereby enabling a simpler structure and further reduction of manufacturing cost.

Furthermore, in the pixel downsampling read mode, not only the capacitance means but also the photoelectric conversion units in pixels to be discarded are used as capacitances for storing signal charges transferred from the transfer means. Accordingly, it is possible to lower the gate voltage applied to the signal amplifying means to reduce the sensitivity of the pixels, thereby reducing the occurrence of flicker with a simple structure as compared with the case of using only the capacitance means as a capacitance for storing signal charges transferred from the transfer means.

Preferably, in the imaging device, the reset means and the pixel selection means are sequentially turned on and off with the transfer means of the pixels to be discarded being turned on so as to read a reset level of each pixel to read a signal from, while the transfer means of each pixel to read a signal from and the pixel selection means are sequentially turned on and off with the transfer means of the pixels to be discarded being maintained in on-state so as to read a signal level of each pixel to read a signal from.

Further preferably, the imaging device further comprises brightness determination means for determining whether or not the brightness of an image received by the imaging device exceeds a predetermined threshold value which is set so that at the predetermined threshold value, a charge accumulation time of each photoelectric conversion unit is equal to or shorter than ½ period of a commercial power supply. The pixel downsampling read mode has: a normal brightness mode to drive the pixel circuit with a normal sensitivity setting if the brightness determination means determines that the brightness of an image received by the imaging device is equal to or lower than the threshold value; and a high brightness mode to drive the pixel circuit with a low sensitivity setting lower than the normal sensitivity setting if the brightness determination means determines that the brightness of the image received by the imaging device exceeds the threshold value. Furthermore, in the high brightness mode, the reset means and the pixel selection means are sequentially turned on and off with the transfer means of the pixels to be discarded being turned on so as to read a reset level of each pixel to read a signal from, while the transfer means of each pixel to read a signal from and the pixel selection means are sequentially turned on and off with the transfer means of the pixels to be discarded being maintained in on-state so as to read a signal level of each pixel to read a signal from.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

Figure 18:
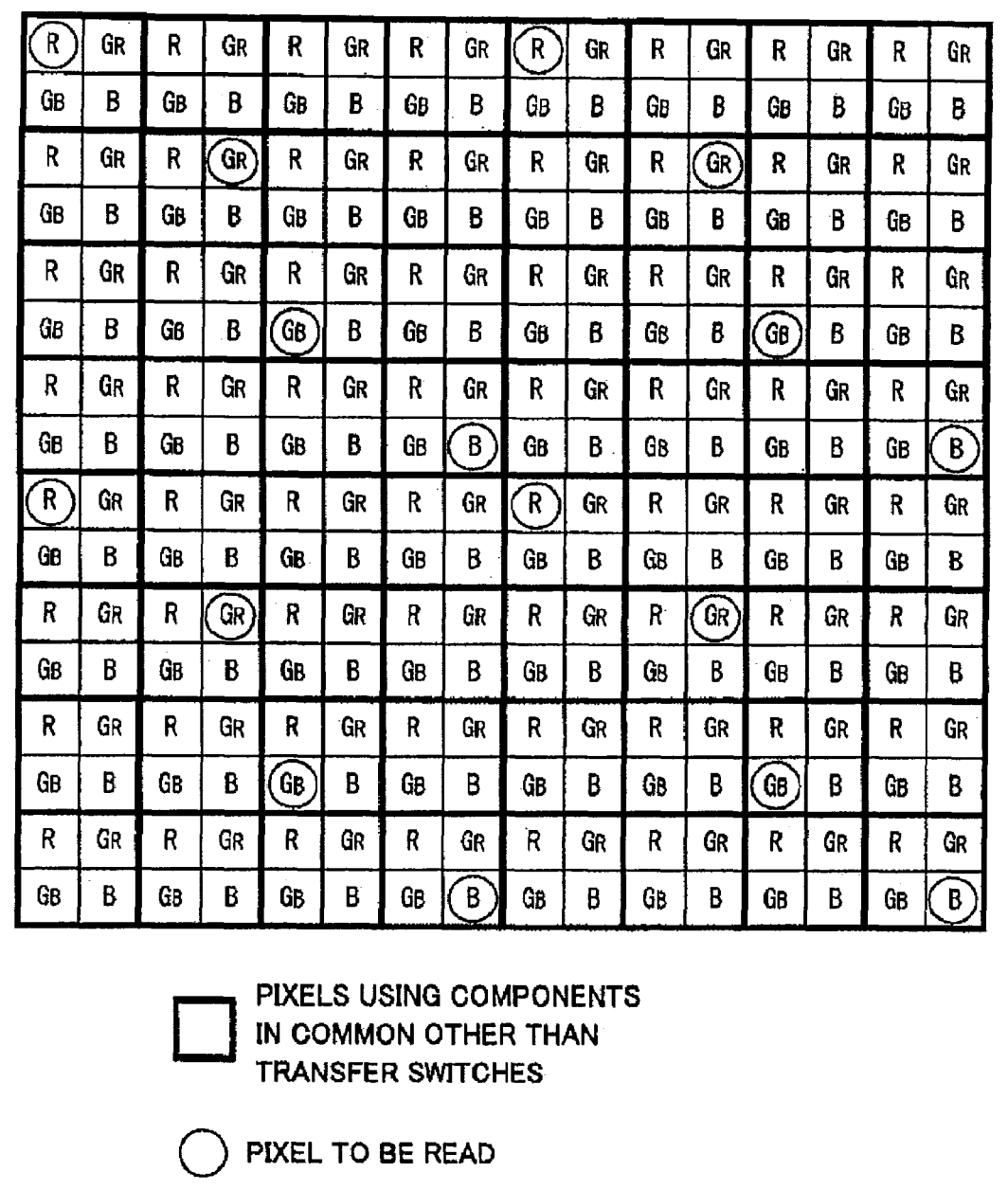

FIG. 18 is a schematic diagram of an example of a color filter arrangement in a Bayer pattern, showing positions of each unit of four adjacent pixels in which one pixel out of the four pixels is read (pixels with color filters of the same color are read both in each row and in each column);

DESCRIPTION OF THE PREFERRED EMBODIMENTS

Figure 1:
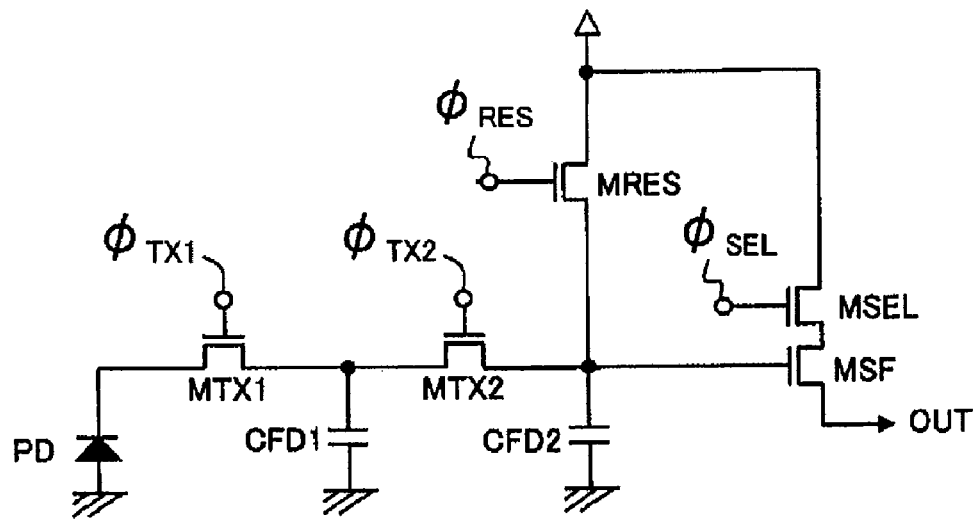
FIG. 1 is a circuit diagram of a pixel circuit applied to a conventional imaging device.
Figure 2:
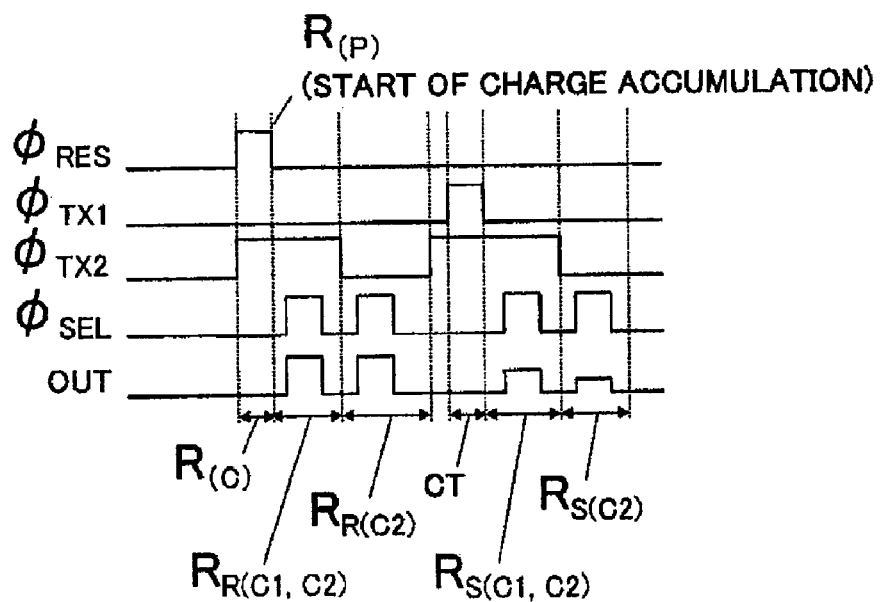
FIG. 2 is a timing chart showing an operation of the conventional pixel circuit.

Embodiments of the present invention, as best mode for carrying out the invention, will be described hereinafter with reference to the drawings. The present invention relates to an imaging device with reduced occurrence of flicker. It is to be understood that the embodiments described herein are not intended as limiting, or encompassing the entire scope of, the present invention. Note that like parts are designated by like reference numerals, characters or symbols throughout the drawings.

First Embodiment

Figure 3:
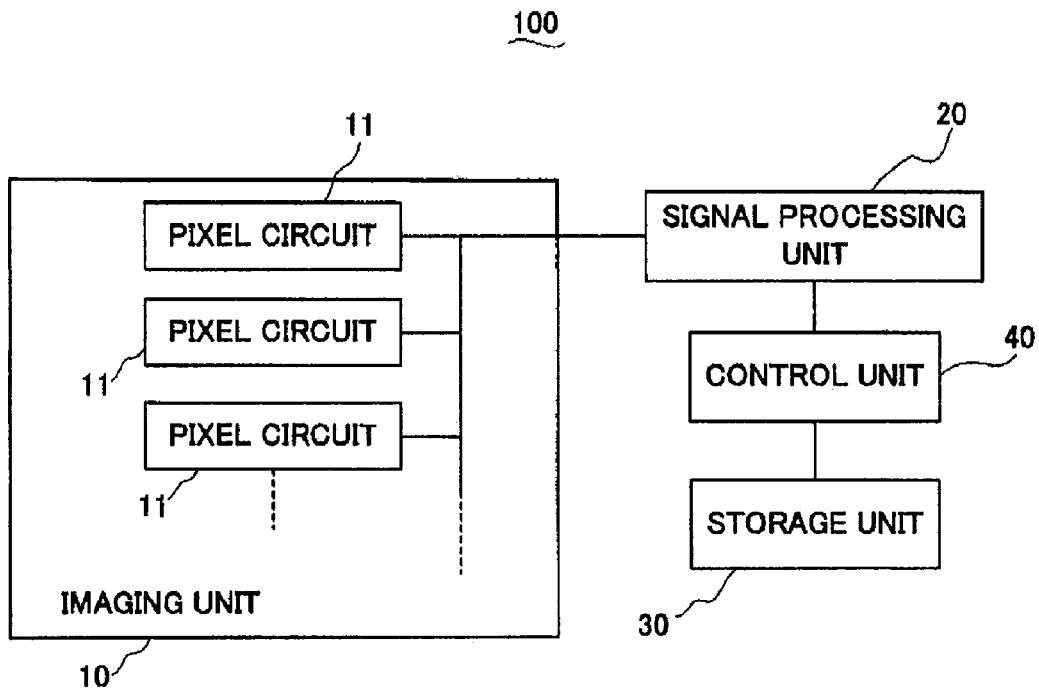
FIG. 3 is a schematic block diagram of an imaging device according to a First Embodiment of the present invention.

An imaging device according to a First Embodiment of the present invention will be described with reference to FIG. 3 to FIG. 9. FIG. 3 is a schematic block diagram of an imaging device 100 according to the First Embodiment of the present invention. The imaging device 100 comprises: an imaging unit 10 having multiple pixels for imaging an image and outputting an electrical signal corresponding to the image; a signal processing unit 20 for processing the electrical signal output from the imaging unit 10; a storage unit 30 for storing electrical signals output from the signal processing unit 20; a control unit 40 for controlling respective units and elements of the imaging device 100; and so on. The imaging unit 10 has many pixel circuits 11.

In a general pixel circuit, various components are provided for each pixel, in which the various components include photodiodes, transfer switches, capacitances, amplifying transistors, reset switches and selection switches as will be described later. However, in the general pixel circuit, many components are required to be mounted in each pixel, making it difficult to reduce the size of the pixel circuit. Thus, according to the present First Embodiment, two adjacent pixels use various components in common, other than the photodiodes and the transfer switches, so as to reduce the size of each pixel, and hence the size of the pixel circuit.

Figure 4:
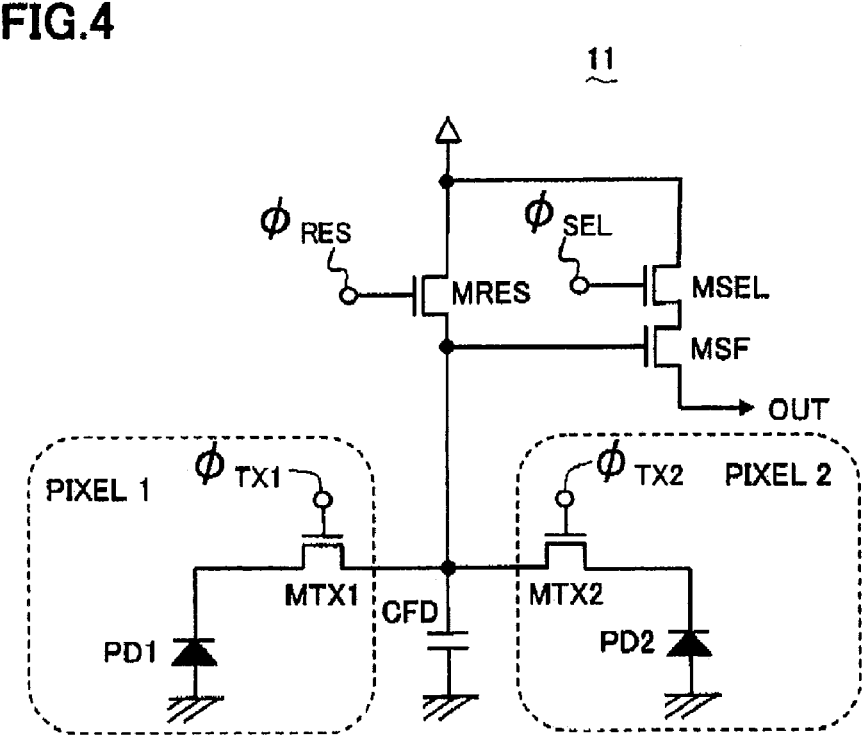
FIG. 4 is a schematic circuit diagram of an example of a pixel circuit applicable to the imaging device of the First Embodiment.

FIG. 4 is a schematic circuit diagram of a pixel circuit 11 applicable to the imaging device 100 of the First Embodiment, in which two adjacent pixels, pixel 1 and pixel 2, among many pixels (multiple pixels) use various components in common other than photodiodes and transfer switches. Specifically, the pixels 1, 2 respectively have photodiodes (photoelectric conversion units) PD1, PD2 for converting light to electrical signals and transfer switches (transfer means) MTX1, MTX2 (transfer transistors) for transferring signal charges output from the photodiodes PD1, PD2.

On the other hand, the pixels 1, 2 use in common: a floating diffusion capacitance (capacitance means) CFD for storing signal charges transferred from the transfer switches MTX1, MTX2; an amplifying transistor (signal amplifying means) MSF such as a source-following amplifying transistor for amplifying and outputting a signal corresponding to the signal charges stored in the capacitance CFD; a reset switch (reset means) MRES (reset transistor) for resetting the signal charges stored in the capacitance CFD; and a selection switch (pixel selection means) MSEL (selection transistor) for selecting pixels to read signals from.

The pixel circuit 11 has an all-pixel read mode to sequentially read signals of the pixel 1 and pixel 2 e.g. for capturing a still image (i.e. mode for reading signals from all pixels) as well as a pixel downsampling read mode to read either one of the pixel 1 and pixel 2 without reading the other (i.e. mode for reading a signal of one pixel by discarding or decimating a signal of the other) e.g. for capturing moving images or for finder display. In the present embodiment and later described embodiments, the term "pixel downsampling read mode" is used to mean that signals of certain one or ones of pixels are read by appropriately discarding the others. In FIG. 4, other reference symbols $\phi_{RES}$, $\phi_{TX1}$, $\phi_{TX2}$ and $\phi_{SEL}$ designate gate voltages of the reset switch MRES, transfer switches MTX1, MTX2 and selection switch MSEL, respectively, while the other reference symbol OUT designates an output voltage (output signal) from the pixel circuit 11.

Figure 5:
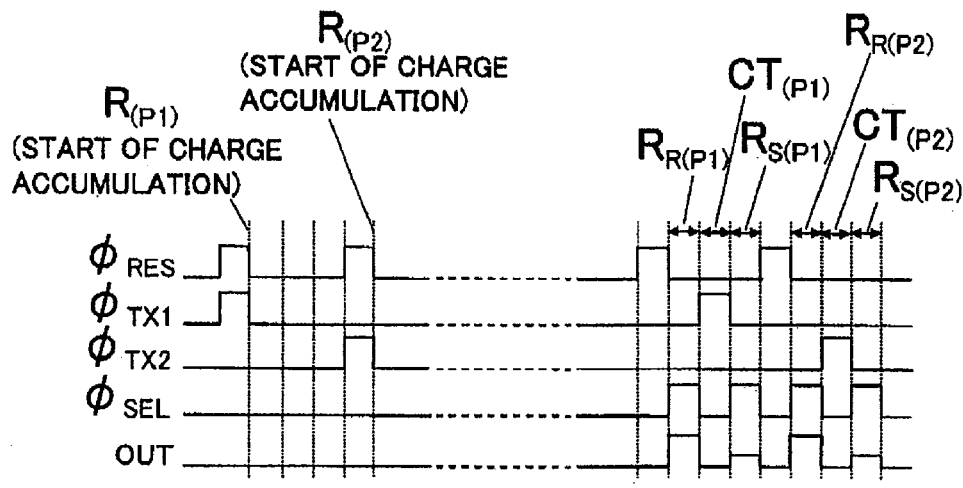
FIG. 5 is a timing chart showing an operation of the pixel circuit in all-pixel read mode.
Figure 6:
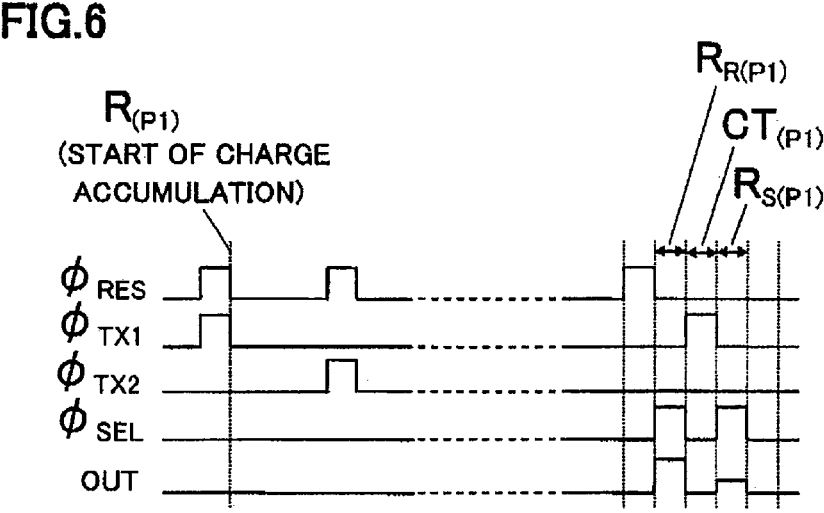
FIG. 6 is a timing chart showing an operation of the pixel circuit in normal brightness mode.
Figure 7:
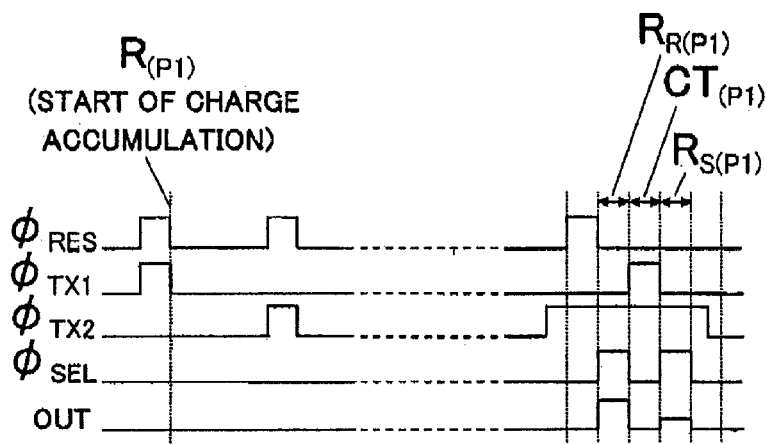
FIG. 7 is a timing chart showing an operation of the pixel circuit in high brightness read mode.

FIG. 5 to FIG. 7 are timing charts showing operations of the pixel circuit 11 shown in FIG. 4 in all-pixel read mode, normal brightness mode and high brightness mode, respectively. In the all-pixel read mode, the pixel circuit 11 operates based on the timing chart shown in FIG. 5, in which: reference symbols $R_{(P1)}$ and $R_{(P2)}$ respectively designate reset points of the pixels 1, 2 at which the photodiodes PD1, PD2 start charge accumulation, respectively; $R_{R(P1)}$ and $R_{R(P2)}$ respectively designate reset level reading periods of the pixels 1, 2 in which the pixel circuit 11 reads reset levels of the pixels 1, 2 to read signals from; $CT_{(P1)}$ and $CT_{(P2)}$ respectively designate charge transfer periods of the pixels 1, 2; and $R_{S(P1)}$ and $R_{S(P2)}$ respectively designate signal level reading periods of pixels 1, 2 when the pixel circuit 11 reads signal levels of the pixels 1, 2. Further, in FIG. 5, other reference symbols $\phi_{RES}$, $\phi_{TX1}$, $\phi_{TX2}$ and $\phi_{SEL}$ designate gate voltages of the reset switch MRES, transfer switches MTX1, MTX2 and selection switch MSEL, respectively, while the other reference symbol OUT designates an output voltage (output signal) from the pixel circuit 11.

Thus, in the all-pixel read mode as shown in FIG. 5, the pixel circuit 11 sequentially reads signals of the pixel 1 and pixel 2, so that the occurrence of flicker is not reduced thereby. However, actually, this is not considered to cause a problem because the all-pixel read mode is usually used e.g. for capturing a still image. That is, assuming that the pixel circuit 11 is applied e.g. to a digital still camera, it normally takes a long time to read signals from all pixels of a still image, so that generally the pixel circuit 11 is used, for example, along with an external shutter. In this case, the charge accumulation time is controlled by the external shutter, which does not cause the problem of flicker.

The following describes a method of reducing the occurrence of flicker in a pixel downsampling read mode in which pixels are skippingly read out. In this pixel downsampling read mode, every other pixel is skipped by using only the pixels 1 and discarding (decimating) the pixels 2. Briefly, the reduction of the occurrence of flicker is done by allowing the photodiode PD2 to serve as a capacitance similar to the capacitance CFD2 in FIG. 1 (prior art). The pixel downsampling read mode has a normal brightness mode and a high brightness mode. More specifically, the pixel downsampling read mode is performed in either normal brightness mode or high brightness mode depending on the brightness of an image received by the imaging device 100 (specifically, each photodiode). The control unit 40 selects or switches the brightness mode of the pixel circuit 11 alternatively between the two brightness modes in the manner described below, and drives the pixel circuit 11 in the selected one of the brightness modes.

The signal processing unit (brightness determination means) 20 determines whether or not the brightness of an image received by the imaging device 100 exceeds a predetermined threshold value, so as to determine whether to drive the pixel circuit in the high brightness mode or the normal brightness mode. More specifically, the normal brightness mode is driven if the signal processing unit 20 determines that the brightness of an image received by the imaging device 100 is equal to or lower than the threshold value, while the high brightness mode is driven if the signal processing unit 20 determines that the brightness of the image received by the imaging device exceeds the threshold value. The imaging device 100 can also be designed to separately provide, in the imaging unit 10, a logic circuit for determining the brightness of the received image. Here, the predetermined threshold value is set so that at the predetermined threshold value of brightness, the charge accumulation time of each of the photodiodes PD1, PD2 is equal to or shorter than ½ (half) period of the commercial AC power supply (which is a lighting period of a fluorescent lighting equipment). In the normal brightness mode, the pixel circuit 11 is driven with a normal sensitivity setting, while in the high brightness mode, the pixel circuit 11 is driven with a low sensitivity setting.

First, a method of driving the pixel circuit 11 of FIG. 4 in the normal brightness mode, which is unlikely to cause flicker to occur without lowering the sensitivity of the pixels (hence of the pixel circuit 11), will be described with reference to FIG. 6. FIG. 6 is a timing chart showing an operation in the normal brightness mode of the pixel circuit 11, in which: reference symbol $R_{(P1)}$ designates a reset point of the pixel 1 at which the photodiode PD1 starts charge accumulation; reference symbol $R_{R(P1)}$ designates a reset level reading period of the pixel 1 in which the pixel circuit 11 reads a reset level of the pixel 1 to read a signal from; reference symbol $CT_{(P1)}$ designates a charge transfer period of the pixel 1; and reference symbol $R_{S(P1)}$ designates a signal level reading period of the pixel 1 when the pixel circuit 11 reads a signal level of the pixel 1. Furthermore, in the timing chart of FIG. 6, other reference symbols $\phi_{RES}$, $\phi_{TX1}$, $\phi_{TX2}$ and $\phi_{SEL}$ designate gate voltages of the reset switch MRES, transfer switches MTX1, MTX2 and selection switch MSEL, respectively, while the other reference symbol OUT designates an output voltage (output signal) from the pixel circuit 11.

When the pixel circuit 11 is driven in the normal brightness mode based on the timing chart of FIG. 6, charge having been stored in the photodiode PD1 is transferred only to the capacitance CFD, because the gate voltage $\phi_{TX2}$ of the transfer switch MTX2 at the time of the reading is maintained at a low level. Assuming that the voltage applied at this time to the gate of the amplifying transistor MSF is $V_{FDH}$, and the amount of charge of the photogenerated carriers stored in the photodiode PD1 is $Q_{PD1}$, the voltage $V_{FDH}$ can be expressed by:

$$V_{FDH}=Q_{PD1}/C_{FD}$$

where $C_{FD}$ is a value of the capacitance CFD. As compared with a voltage applied to the gate of the amplifying transistor MSF in the high brightness mode (which is voltage $V_{FD}$ described below), the voltage $V_{FDH}$ is maintained high if the amount of charge $Q_{PD1}$ in the normal brightness mode is the same as that in the high brightness mode, so that the sensitivity of the pixel 1 (hence of the pixel circuit 11) is maintained high. Note that the signal of the pixel 2 is not read (discarded) because of the pixel downsampling read mode.

Next, a method of driving the pixel circuit 11 of FIG. 4 in the high brightness mode will be described with reference to FIG. 7. Generally, in the high brightness mode, flicker is likely to occur, and an imaging device is unlikely to be able to normally operate (e.g. produce an accurate image) if each photodiode has a long charge accumulation time longer than the threshold value which is e.g. a half period of the commercial AC power supply. The operation of the pixel circuit 11 using the method here solves this problem. FIG. 7 is a timing chart showing an operation in the high brightness mode of the pixel circuit 11, in which all the reference symbols correspond to those in FIG. 6.

Based on the timing chart of FIG. 7, the pixel circuit 11 is driven in the high brightness mode, whereby the sensitivity of each pixel 1 (and hence of the pixel circuit 11) is lowered in the following manner. The reset switch MRES and the selection switch MSEL are sequentially turned on and off while the transfer switch MTX2 of the pixel 2 to be discarded or decimated is turned on, so as to read a reset level of the pixel 1 to read a signal from. Further, the transfer switch MTX1 of the pixel 1 to read a signal from and the selection switch MSEL are sequentially turned on and off while the transfer switch MTX2 of the pixel 2 to be discarded or decimated is maintained in the on-state, so as to read a signal level of the pixel 1. Since the gate voltage $\phi_{TX2}$ of the transfer switch MTX2 at the time of the reading is at a high level, charge having been stored in the photodiode PD1 is divided and transferred by the transfer switch MTX1 to the capacitance CFD and the photodiode PD2.

Assuming that the voltage applied at this time to the gate of the amplifying transistor MSF is $V_{FD}$, and the capacitance value of the photodiode PD2 is $C_{PD2}$, the voltage $V_{FD}$ can be expressed by:

$$V_{FD}=Q_{PD1}/(C_{FD}+C_{PD2})$$

where $Q_{PD1}$ is the amount of charge stored in the photodiode PD1, and $C_{FD}$ is a value of the capacitance CFD. This indicates that the value of the voltage $V_{FD}$ can be lowered (as compared with the voltage $V_{FDH}$) without reducing the charge accumulation time if the amount of charge $Q_{PD1}$ in the high brightness mode is the same as that in the normal brightness mode, so that the sensitivity of the pixel circuit 11 is reduced, making it possible to reduce the occurrence of flicker. Although the present embodiment has described a method of reading a signal of each pixel 1, it is needless to say that a signal of each pixel 2 can be similarly read by exchanging the gate voltage $\phi_{TX1}$ of the transfer switch MTX1 and the gate voltage $\phi_{TX2}$ of the transfer switch MTX2 at the time of the reading.

It is to be noted that the above descriptions have been simplified to clarify the main feature of the present invention. Actually, color filters are provided respectively for the pixels, and hence for the photodiodes, in the pixel circuit. The following describes two kinds of color filter arrangements with reference to FIG. 8 and FIG. 9 as examples to which the pixel circuit 11 of the present embodiment is applied.

Figure 8:
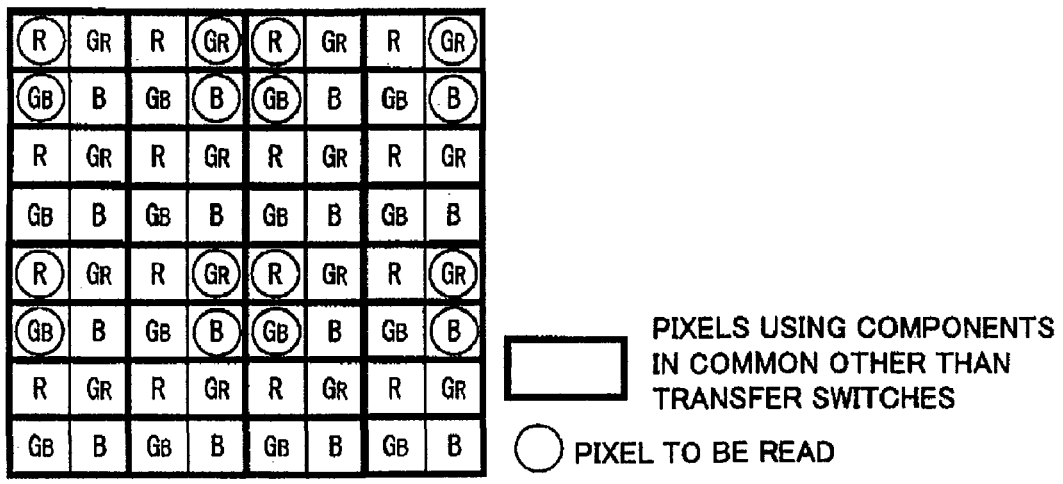
FIG. 8 is a schematic diagram of an example of a color filter arrangement in a Bayer pattern in the pixel circuit, showing positions of each pair of two adjacent pixels (R and GR) and (GB and B) to read a signal from, in which the pair of two adjacent pixels uses a capacitance CFD in common.
Figure 9:
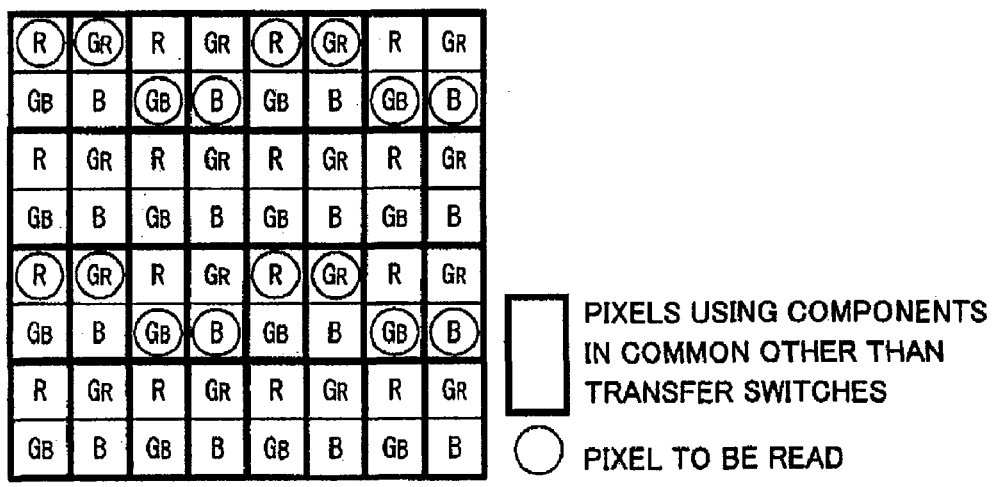
FIG. 9 is a schematic diagram of an example of a color filter arrangement in a Bayer pattern in the pixel circuit, showing positions of each pair of two adjacent pixels (R and GR) and (GB and B) to read a signal from, in which the pair of two adjacent pixels uses a capacitance CFD in common.

Each of FIG. 8 and FIG. 9 is a schematic diagram of an example of a color filter arrangement in a Bayer pattern (mosaic pattern) of a block of 8×8 pixels in the pixel circuit 11 shown in FIG. 4, showing positions of each pair of two adjacent pixels (R and GR) and (GB and B) to read a signal from, in which the each pair of two adjacent pixels (R and GR) and (GB and B) indicated by a bold lined frame uses various components such as the CFD in common other than the photodiodes PD1, PD2 and the transfer switches MTX1, MTX2. Here, reference characters R and B respectively indicate positions of red and blue color filters, while GR and GB respectively indicate a position of a green color filter in a row containing red color filters and a position of a green color filter in a row containing green color filters.

More specifically, FIG. 8 shows positions of pixels to be read, using circles in pairs of two adjacent pixels (R and GR) and (GB and B) which are adjacent in the row direction, and which use various components in common other than the photodiodes PD1, PD2 and the transfer switches MTX1, MTX2. In this case, 2×2 pixels out of 4×4 pixels are read, downsampling the pixels to ½ (half) in each of the row and column directions. All the colors of R, GR, BG and B can be read by reading these 2×2 pixels.

Similarly, FIG. 9 shows positions of pixels to be read, using circles in pairs of two adjacent pixels (R and GB) and (GR and B) which are adjacent in the column direction, and which use various components in common other than the photodiodes PD1, PD2 and the transfer switches MTX1, MTX2. In this case, similarly as in FIG. 8, 2×2 pixels out of 4×4 pixels are read, downsampling the pixels to ½ (half) in each of the row and column directions. All the colors of R, GR, BG and B can be read by reading these 2×2 pixels.

Note that although each of FIG. 8 and FIG. 9 shows an arrangement of color filters such that the first row starts with R, GR, and the second row starts with GB, B, similar effects or results can be obtained by other arrangements. Further, in the block of 8×8 pixels, similar effects and results can be obtained even by changing the sequence of reading pixels, assuming that the positions of the pixels to be read are relatively the same, and the reading conditions are the same. Under these assumptions, similar effects and results can be obtained even if, for example, the first row starts with GR, R, and the second row starts with B, BG.

Second Embodiment

Figure 10:
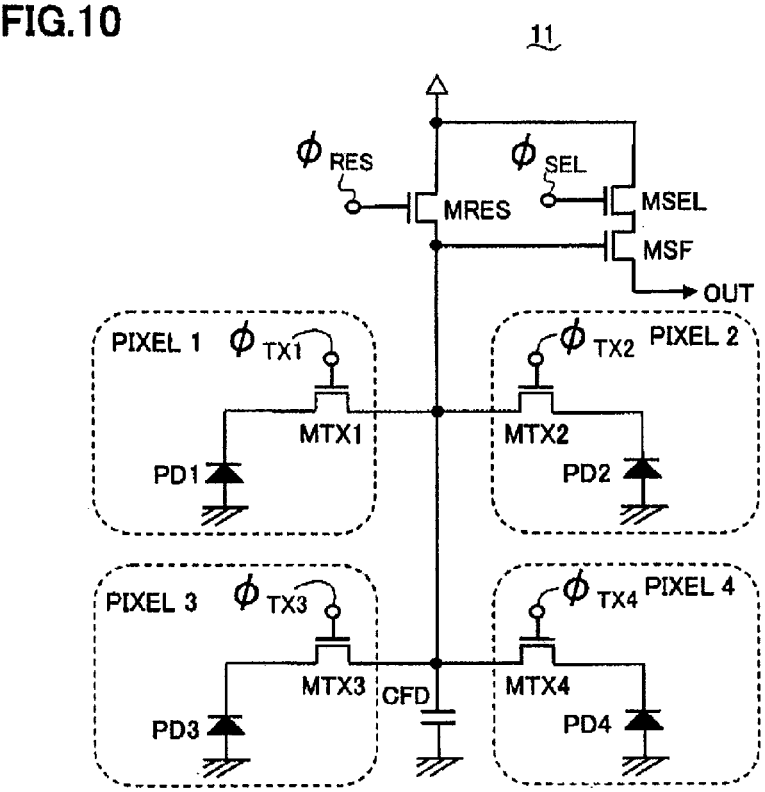
FIG. 10 is a schematic circuit diagram of an example of a pixel circuit applicable to an imaging device of a Second Embodiment.

Next, a Second Embodiment of the present invention will be described with reference to FIG. 10 to FIG. 18. FIG. 10 is a schematic circuit diagram of an example of a pixel circuit 11 applicable to an imaging device 100 of the Second Embodiment which is similar to the imaging device 100 of the First Embodiment except for the points as will be described below. Pixels 1, 2, 3, 4 (one of multiple units each of four pixels) respectively have photodiodes photoelectric conversion units) PD1, PD2, PD3, PD4 for converting light to electrical signals as well as transfer switches (transfer means) MTX1, MTX2, MTX3, MTX4 for transferring signal charges output from the photodiodes PD1, PD2, PD3, PD4.

In the pixel circuit 11 of FIG. 10, the four adjacent pixels, pixels 1 to 4, among many pixels (multiple units of four pixels) use various components in common other than the photodiodes PD1, PD2, PD3, PD4 and transfer switches MTX1, MTX2, MTX3, MTX4, so as to reduce the size of each pixel. More specifically, the pixels 1, 2, 3, 4 use in common: a floating diffusion capacitance (capacitance means) CFD for storing signal charges transferred from the transfer switches MTX1, MTX2, MTX3, MTX4; an amplifying transistor (signal amplifying means) MSF such as a source-following amplifying transistor for amplifying and outputting a signal corresponding to the signal charges stored in the capacitance CFD; a reset switch (reset means) MRES for resetting the signal charges stored in the capacitance CFD; and a selection switch (pixel selection means) MSEL for selecting pixels to read signals from.

Figure 11:
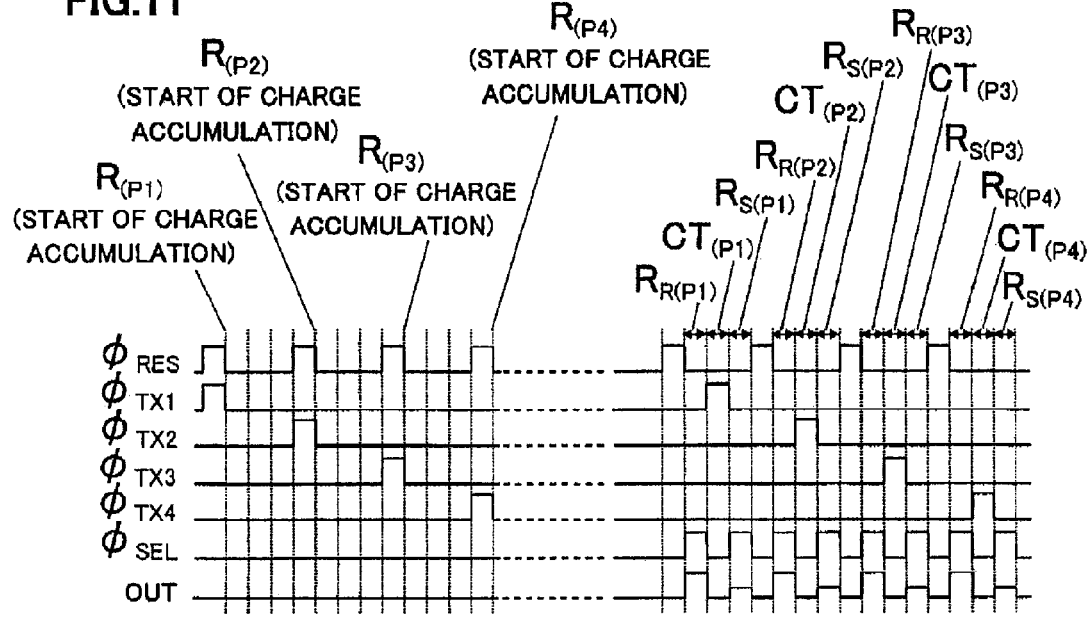
FIG. 11 is a timing chart showing an operation of the pixel circuit in all-read mode.
Figure 12:
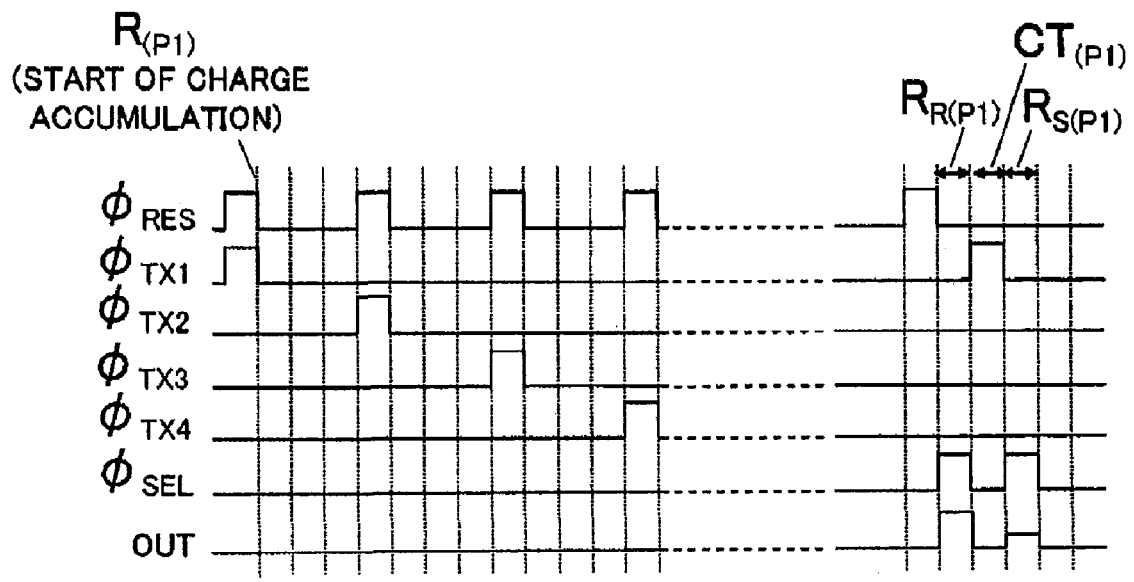
FIG. 12 is a timing chart showing an operation of the pixel circuit in normal brightness mode.
Figure 13:
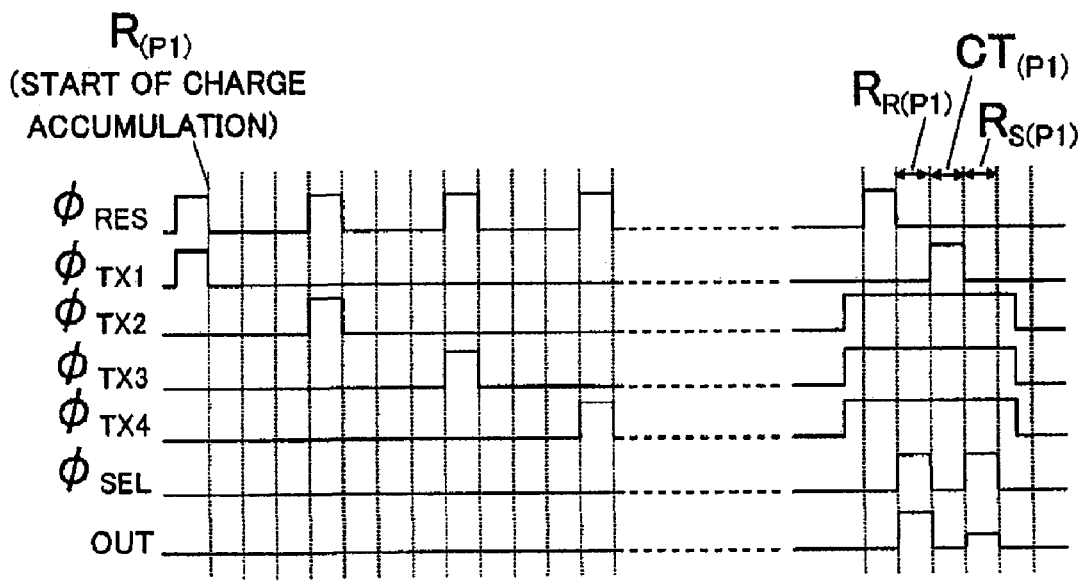
FIG. 13 is a timing chart showing an operation of the pixel circuit in high brightness mode, showing the case of reading pixel 1 and using three pixels 2, 3, 4 as capacitances.
Figure 14:
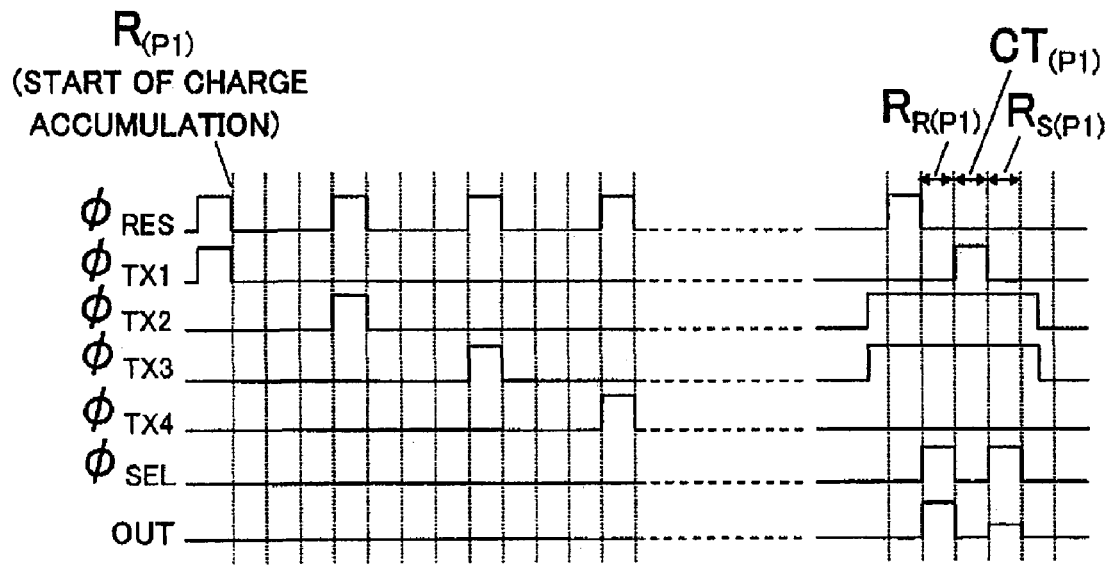
FIG. 14 is a timing chart showing an operation of the pixel circuit in high brightness mode, showing the case of reading pixel 1 and using two pixels 2, 3 as capacitances.
Figure 15:
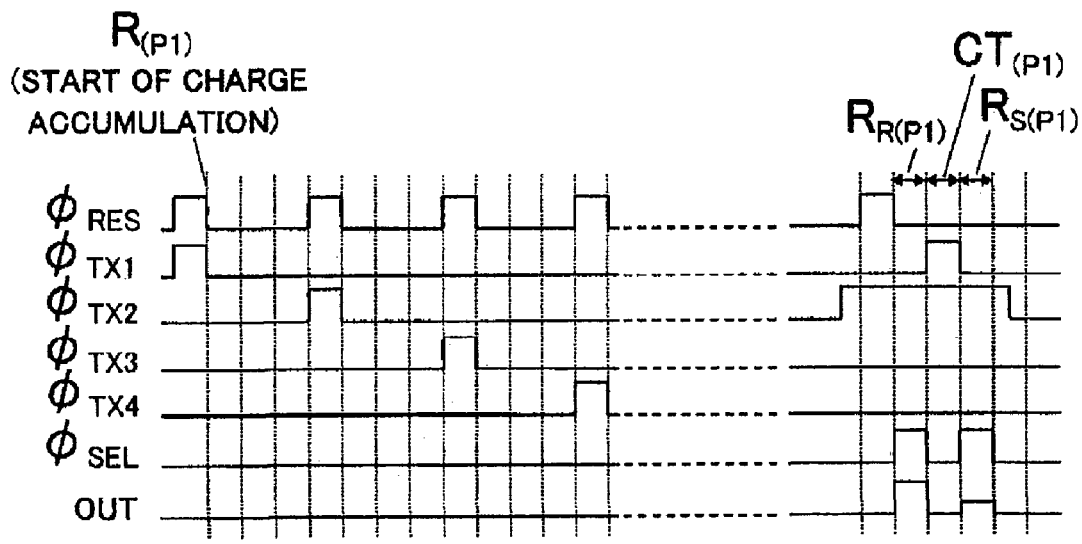
FIG. 15 is a timing chart showing an operation of the pixel circuit in high brightness mode, showing the case of reading pixel 1 and using one pixel 2 as a capacitance.

The pixel circuit 11 has an all-pixel read mode to sequentially read signals of the pixels 1, 2, 3, 4 e.g. for capturing a still image as well as a pixel downsampling read mode to read one of the pixels 1, 2, 3, 4 (e.g. pixel 1) without reading the others (i.e. by discarding or decimating the others such as pixels 2, 3, 4) e.g. for capturing moving images or for finder display. In FIG. 10, other reference symbols $\phi_{RES}$, $\phi_{TX1}$, $\phi_{TX2}$, $\phi_{TX3}$, $\phi_{TX4}$ and $\phi_{SEL}$ designate gate voltages of the reset switch MRES, transfer switches MTX1, MTX2, MTX3, MTX4 and selection switch MSEL, respectively, while the other reference symbol OUT designates an output voltage (output signal) from the pixel circuit 11. FIG. 11 and FIG. 12 are timing charts showing operations of the pixel circuit 11 shown in FIG. 10 in the all-pixel read mode and normal brightness mode, respectively, while FIG 13 to FIG. 15 are timing charts showing operations of the pixel circuit 11 shown in FIG. 10 each in high brightness mode and each showing the case of reading the pixel 1, in which FIG. 13 to FIG. 15 show cases of using three photodiodes PD2, PD3, PD4 (three pixels 2, 3, 4), using two photodiodes PD2, PD3 (two pixels 2, 3) and using one photodiode PD2 (one pixel 2), respectively, as capacitances.

In the all-pixel read mode, the pixel circuit 11 operates based on the timing chart shown in FIG. 11 to sequentially read signals of the pixel 1 to pixel 4, in which: reference symbols $R_{(P1)}$, $R_{(P2)}$, $R_{(P3)}$, $R_{(P4)}$ respectively designate reset points of the pixels 1, 2, 3, 4 at which the photodiodes PD1, PD2, PD3, PD4 start charge accumulation, respectively; reference symbols $R_{R(P1)}$, $R_{R(P2)}$, $R_{R(P3)}$, $R_{R(P4)}$ respectively designate reset level reading periods of the pixels 1, 2, 3, 4 in which the pixel circuit 11 reads reset levels of the pixels 1, 2, 3, 4 to read signals from; $CT_{(P1)}$, $CT_{(P2)}$, $CT_{(P3)}$, $CT_{(P4)}$ respectively designate charge transfer periods of the pixels 1, 2, 3, 4; and $R_{S(P1)}$, $R_{S(P2)}$, $R_{S(P3)}$, $R_{S(P4)}$ respectively designate signal level reading periods of pixels 1, 2, 3, 4 when the pixel circuit 11 reads signal levels of the pixels 1, 2, 3, 4. Furthermore, in FIG. 11, other reference symbols $\phi_{RES}$, $\phi_{TX1}$, $\phi_{TX2}$, $\phi_{TX3}$, $\phi_{TX4}$ and $\phi_{SEL}$ designate gate voltages of the reset switch MRES, transfer switches MTX1, MTX2, MTX3, MTX4 and selection switch MSEL, respectively, while the other reference symbol OUT designates an output voltage (output signal) from the pixel circuit 11.

The following describes a method of reducing the occurrence of flicker in a pixel downsampling read mode in which pixels are skippingly read out. In this pixel downsampling read mode, each of the pixels 2 to 4 is skipped by using only each pixel 1 and discarding the pixels 2 to 4. The reduction of the occurrence of flicker is done by allowing one of the photodiodes PD2, PD3, PD4 or a combination of these to serve as a capacitance similar to the photodiode PD2 in FIG. 4 of the First Embodiment or the capacitance CFD2 in FIG. 1 (Prior art). Similarly as in the First Embodiment, the pixel downsampling read mode is performed in either normal or high brightness mode depending on the brightness of an image received by the imaging device 100 (specifically by each photodiode). The control unit 40 selects the brightness mode of the pixel circuit 11 alternatively between the two brightness modes in the manner described below, and drives the pixel circuit 11 in the selected brightness mode. Various other components in the imaging device 100 in the present Second Embodiment function in a similar manner as in the First Embodiment.

First, a method of driving the pixel circuit 11 of FIG. 10 in the normal brightness mode, which is unlikely to cause flicker to occur without lowering the sensitivity of the pixels (hence of the pixel circuit 11), will be described with reference to FIG. 12. FIG. 12 is a timing chart showing an operation in the normal brightness mode of the pixel circuit 11, in which: reference symbol $R_{(P1)}$ designates a reset point of the pixel 1 at which the photodiode PD1 starts charge accumulation; $R_{R(P1)}$ designates a reset level reading period of the pixel 1 in which the pixel circuit 11 reads a reset level of the pixel 1 to read a signal from; $CT_{(P1)}$ designates a charge transfer period of the pixel 1; and $R_{S(P1)}$ designates a signal level reading period of the pixel 1 when the pixel circuit 11 reads a signal level of the pixel 1. Further, in FIG. 12, other reference symbols $\phi_{RES}$, $\phi_{TX1}$, $\phi_{TX2}$, $\phi_{TX3}$, $\phi_{TX4}$ and $\phi_{SEL}$ designate gate voltages of the reset switch MRES, transfer switches MTX1, MTX2, MTX3, MTX4 and selection switch MSEL, respectively, while the other reference symbol OUT designates an output voltage (output signal) from the pixel circuit 11.

When the pixel circuit 11 is driven in the normal brightness mode based on the timing chart of FIG. 12, charge having been stored in the photodiode PD1 is transferred only to the capacitance CFD, because the gate voltages $\phi_{TX2}$, $\phi_{TX3}$, $\phi_{TX4}$ of the transfer switches MTX2, MTX3, MTX4 at the time of the reading are maintained at a low level. Assuming that the voltage applied at this time to the gate of the amplifying transistor MSF is $V_{FDH}$, and the amount of charge of the photogenerated carriers stored in the photodiode PD1 is $Q_{PD1}$, the voltage $V_{FDH}$ can be expressed by:

$$V_{FDH}=Q_{PD1}/C_{FD}$$

where $C_{FD}$ is a value of the capacitance CFD. As compared with a voltage applied to the gate of the amplifying transistor MSF in the high brightness mode (which is voltage $V_{FD}$ described below), the voltage $V_{FDH}$ is maintained high if the amount of charge $Q_{PD1}$ in the normal brightness mode is the same as that in the high brightness mode, so that the sensitivity of the pixel 1 (hence of the pixel circuit 11) is maintained high. Note that the signals of the pixels 2, 3, 4 are not read (discarded) because of the pixel downsampling read mode.

Next, a method of driving the pixel circuit 11 of FIG. 10 in the high brightness mode will be described with reference to FIG. 13. Generally, in the high brightness mode, flicker is likely to occur, and an imaging device is unlikely to be able to normally operate if each photodiode has a long charge accumulation time longer than the threshold value which is e.g. a half period of the commercial AC power supply. The operation of the pixel circuit 11 using the method here solves this problem by reducing the sensitivity of the pixel circuit 11 with a simple structure. FIG. 13 is a timing chart showing an operation in the high brightness mode of the pixel circuit 11, in which all the reference symbols correspond to those in FIG. 12. The reference symbols in later described FIG. 13, FIG. 14 and FIG. 15 also correspond to those.

Based on the timing chart of FIG. 13, the pixel circuit 11 is driven in the high brightness mode, whereby the sensitivity of each pixel 1 (and hence of the pixel circuit 11) is lowered in the following manner. The reset switch MRES and the selection switch MSEL are sequentially turned on and off while the transfer switches MTX2, MTX3, MTX4 of the pixels 2, 3, 4 to be discarded or decimated are turned on, so as to read a reset level of the pixel 1 to read a signal from. Further, the transfer switch MTX1 of the pixel 1 to read a signal from and the selection switch MSEL are sequentially turned on and off while the transfer switch MTX2 of the pixel 2 to be discarded or decimated is maintained in the on-state, so as to read a signal level of the pixel 1. Since the gate voltages $\phi_{TX2}$, $\phi_{TX3}$, $\phi_{TX4}$ of the transfer switches MTX2, MTX3, MTX4 at the time of the reading are at a high level, charge having been stored in the photodiode PD1 is divided and transferred by the transfer switch MTX1 to the capacitance CFD and the photodiodes PD2, PD3, PD4.

Assuming that the voltage applied at this time to the gate of the amplifying transistor MSF is $V_{FD}$, and the capacitance values of the photodiodes PD2, PD3, PD4 are $C_{PD2}$, $C_{PD3}$, $C_{PD4}$, the voltage $V_{FD}$ can be expressed by:

$$V_{FD}=Q_{PD1}/(C_{FD}+C_{PD2}+C_{PD3}+C_{PD4})$$

where $Q_{PD1}$ is the amount of charge stored in the photodiode PD1, and $C_{FD}$ is a value of the capacitance CFD. This indicates that the value of the voltage $V_{FD}$ can be lowered (as compared with the voltage $V_{FDH}$) without reducing the charge accumulation time if the amount of charge $Q_{PD1}$ in the high brightness mode is the same as that in the normal brightness mode, so that the sensitivity of the pixel circuit 11 is reduced, making it possible to reduce the occurrence of flicker.

Note that the pixel circuit 11 of FIG. 10 has three photodiodes PD2, PD3, PD4, which can be used as capacitances, and FIG. 13 shows the case of using all the three photodiodes PD2, PD3, PD4. However, it is not the only way. For example, the pixel circuit 11 can similarly operate even in the case of using two photodiodes PD2, PD3 as capacitances as shown in FIG. 14, or in the case of using one photodiode PD2 as a capacitance as shown in FIG. 15. By varying the number of such photodiodes used as capacitances according to the brightness of an image received by the imaging device 100, it becomes possible to achieve a finer change in the sensitivity of the pixels or pixel circuit 11. Note further that although the present embodiment has described a method of reading signal of each pixel 1, it is needless to say that a signal of each pixel 2, each pixel 3 or each pixel 4 can be similarly read by exchanging the gate voltage $\phi_{TX1}$ of the transfer switch MTX1 and one of the gate voltages $\phi_{TX2}$, $\phi_{TX3}$, $\phi_{TX4}$ of the transfer switches MTX2, MTX3, MTX4 at the time of the reading.

Similarly as in the First Embodiment, color filters are actually provided for the pixels and hence for the photodiodes in the pixel circuit, respectively. The following describes three kinds of color filter arrangements with reference to FIG. 16 to FIG. 18 as examples to which the pixel circuit 11 of the present embodiment is applied. Each of FIG. 16, FIG. 17 and FIG. 18 is a schematic diagram of an example of a color filter arrangement in a Bayer pattern (mosaic pattern) of a block of 16×16 pixels in the pixel circuit 11 shown in FIG. 10, although each of FIG. 16 and FIG. 17 shows a block of 8×8 pixels.

Figure 16:
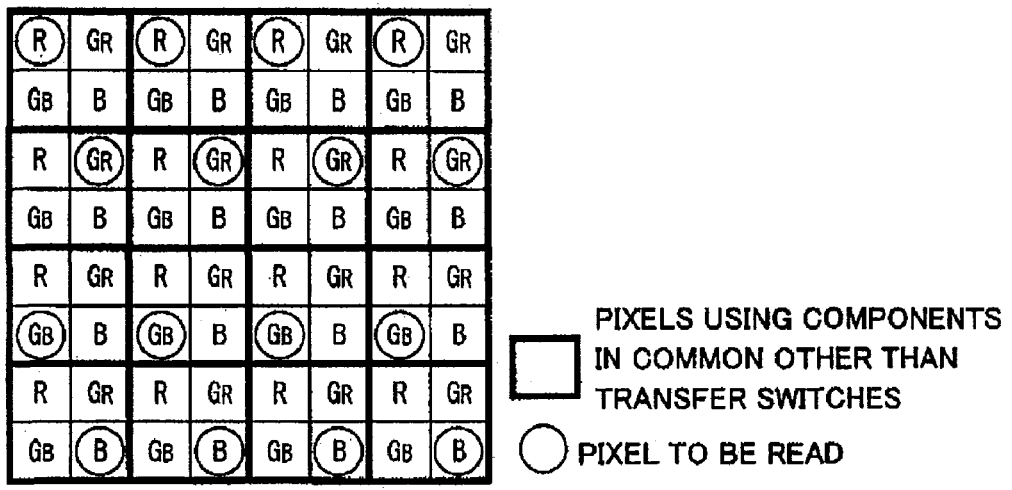
FIG. 16 is a schematic diagram of an example of a color filter arrangement in a Bayer pattern, showing positions of each unit of four adjacent pixels in which one pixel out of the four pixels is read (pixels with color filters of the same color are read in each row)

More specifically, FIG. 16 shows positions of each unit of four adjacent pixels (R, GR, GB, B) to read a signal from, in which the each unit of four adjacent pixels (R, GR, GB, B) indicated by a bold lined frame uses various components such as the CFD in common other than the photodiodes PD1, PD2, PD3, PD4 and the transfer switches MTX1, MTX2, MTX3, MTX4. Here, reference characters R, B, GR and GB indicate positions of red, blue, green and green color filters similarly as in FIGS. 8 and 9. These reference characters will be similarly used in later described FIG. 18.

FIG. 16 shows positions of pixels to be read, using circles in units of four adjacent pixels (R, GR, GB, B), in which pixels with color filters of the same color are read in each row subjected to the reading. In the example of FIG. 16, the portion of the block of 16×16 pixels which is not shown, namely other than the shown block of 8×8 pixels, is not read, namely not used for reading. Thus, in the example of FIG. 16, 4×4 pixels out of 16×16 pixels are read, downsampling the pixels to ¼ (quarter) in each of the row and column directions. All the colors of R, GR, BG and B can be read by reading these 4×4 pixels. In the case of the example of FIG. 16, the sequence of outputting the four colors is different from that in the case of the all-pixel read mode, so that a color signal processing adapted to the sequence for the case of FIG. 16 is separately needed. Nevertheless, the example of FIG. 16 has an advantage of faster reading, because only 4 rows out of the 8 rows are subjected to the reading.

Figure 17:
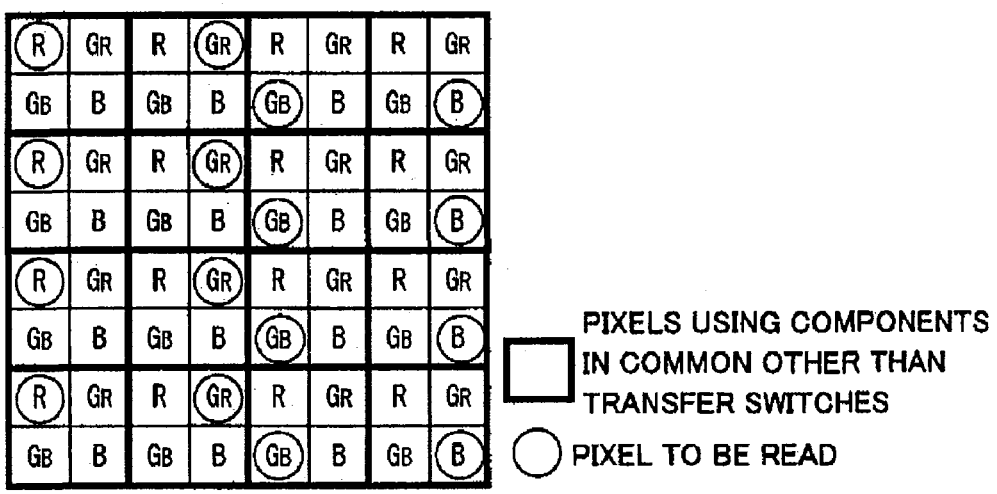
FIG. 17 is a schematic diagram of an example of a color filter arrangement in a Bayer pattern, showing positions of each unit of four adjacent pixels in which one pixel out of the four pixels is read (pixels with color filters of the same color are read in each column)

Similarly, FIG. 17 shows positions of pixels to be read, using circles in units of four adjacent pixels (R, GB, GR, B), in which pixels with color filters of the same color are read in each column subjected to the reading. Similarly as in FIG. 16, in FIG. 17, the portion of the block of 16×16 pixels other than the shown block is not read, so that 4×4 pixels out of 16×16 pixels are read, downsampling the pixels to ¼ (quarter) in each of the row and column directions. All the colors of R, GR, BG and B can be read by reading these 4×4 pixels. In the case of FIG. 17, the sequence of outputting the four colors is the same as that in the case of the all-pixel read mode, so that it is advantageous in that a color signal processing for the all-pixel read mode can be used in common for the case of FIG. 17.

FIG. 18 shows positions of pixels to be read, using circles in units of four adjacent pixels (R, GB, GR, B). In FIG. 18, pixels with color filters of the same color are read both in each row and in each column subjected to the reading. More specifically, two pixels with color filters of the same color (e.g. R) are skippingly read in two rows subjected to the reading, while in two columns respectively containing the two pixels read in the two rows, two pixels with color filters of the same color (e.g. R) are skippingly read. Thus, all the four pixels with color filters of the same color (e.g. R) to be read, or to read signals from, are present in two rows and two columns.

In the example of FIG. 16 and in the example of FIG. 17, 4×4 pixels are read from the block of 8×8 pixels which is a localized portion of the unit block of 16×16 pixels. Thus, the pixel reading according to the example of FIG. 16 or FIG. 17 drops information in the unit block, thereby producing spatially less evenly weighted image information. In contrast, the pixel reading according to the example of FIG. 18 is advantageous in that image information is read from spatially evenly distributed pixels, thereby producing spatially more evenly weighted image information. Thus, considering the entire 16×16 pixels, it can be said that the example of FIG. 18 produces a more accurate or higher fidelity image than the example of FIG. 16 or FIG. 17, causing better image solution to be viewed.

Note that although each of FIG. 16, FIG. 17 and FIG. 18 shows an arrangement of color filters such that the first row starts with R, GR, and the second row starts with GB, B, similar effects or results can be obtained by other arrangements. Further, in the unit block of 16×16 pixels, similar effects and results can be obtained even by changing the sequence of reading pixels, assuming that the positions of the pixels to be read are relatively the same, and the reading conditions are the same.

Third Embodiment

Next, a Third Embodiment of the present invention will be described with reference to FIG. 19 and FIG. 20. The Third Embodiment is the same as the Second Embodiment in the structure of a pixel circuit 11 in an imaging device 100, but is different from the Second Embodiment in a method of driving the pixel circuit 11, particularly in the operation of the pixel circuit 11 in high brightness mode. All-pixel read mode and normal brightness mode in the pixel downsampling read mode in the Third Embodiment are performed in the same manner as in the Second Embodiment. That is, the pixel circuit 11 in the Third Embodiment operates based on the timing charts shown in FIG. 11 and FIG. 12 in the all-pixel read mode and in the normal brightness mode in the pixel downsampling read mode, respectively.

Figure 19:
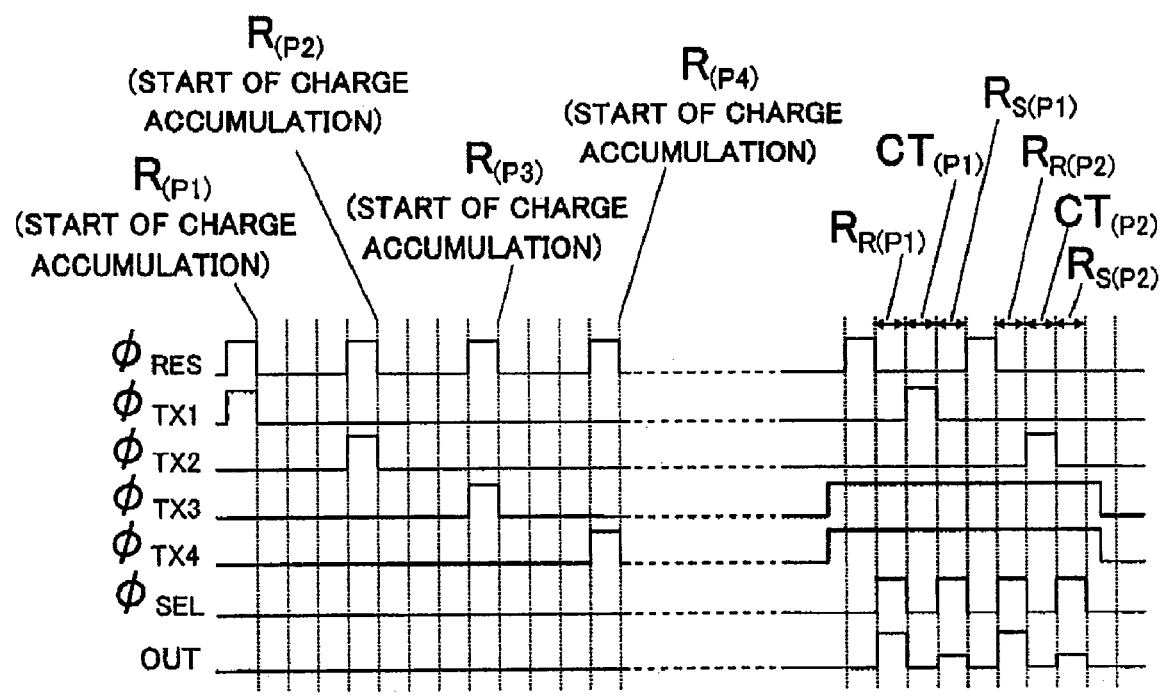
FIG. 19 is a timing chart showing an operation of a pixel circuit applicable to an imaging device of a Third Embodiment in high brightness mode, in which pixels 1, 2 are used as pixels to be read, while pixels 3, 4 are used as capacitances.

FIG. 19 is a timing chart showing an operation of the pixel circuit 11 of FIG. 10 in high brightness mode in pixel downsampling read mode, in which the pixel 1 and the pixel 2 are used as pixels to be read, while the pixel 3 and the pixel 4 are used as capacitances, and in which reference symbols in which: reference symbols $R_{(P1)}$, $R_{(P2)}$, $R_{(P3)}$, $R_{(P4)}$ respectively designate reset points of the pixels 1, 2, 3, 4 at which the photodiodes PD1, PD2, PD3, PD4 start charge accumulation, respectively; reference symbols $R_{R(P1)}$, $R_{R(P2)}$ respectively designate reset level reading periods of the pixels 1, 2 in which the pixel circuit 11 reads reset levels of the pixels 1, 2 to read signals from; reference symbols $CT_{(P1)}$, $CT_{(P2)}$ respectively designate charge transfer periods of the pixels 1, 2; and reference symbols $R_{S(P1)}$, $R_{S(P2)}$ respectively designate signal level reading periods of pixels 1, 2 when the pixel circuit 11 reads signal levels of the pixels 1, 2.

When the pixel circuit 11 is driven based on the timing chart of FIG. 19, the two photodiodes PD3, PD4 are used as capacitances, while the pixel 1 and the pixel 2 are sequentially read. This operation has an advantage of faster reading, because two pixels can be read by scanning a block of four pixels once. Although the combination of the pixel 1 and the pixel 2 has been described above as pixels to be read, it is a matter of course that it can be replaced by a different combination of pixels such as the combination of the pixel 1 and the pixel 3.

Figure 20:
FIG. 20 is a schematic diagram of an example of a color filter arrangement in a Bayer pattern, showing positions of each unit of four adjacent pixels in which two pixels out of the four pixels are read.
Figure 20:

FIG. 20 is a schematic diagram of an example of a color filter arrangement in a Bayer pattern (mosaic patter) of a block of 16×16 pixels in the pixel circuit 11 shown in FIG. 10, showing positions of each unit of four adjacent pixels (2×2 pixels that are R, GR, GB, B) to read a signal from, in which the each unit of four adjacent pixels indicated by a bold lined frame uses various components such as the CFD in common other than the photodiodes PD1, PD2, PD3, PD4 and the transfer switches MTX1, MTX2, MTX3, MTX4. Here, reference characters R, B, GR and GB indicate positions of red, blue, green and green color filters similarly as in e.g. FIG. 8. Hereafter, the unit of four adjacent pixels (2×2 pixels that are R, GR, GB, B) is referred to as a four-pixel unit. FIG. 20 shows positions of pixels to be read, using circles in the four-pixel units, showing that the pixel circuit 11 reads two pixels in each four-pixel unit subjected to the reading. A feature of the example of FIG. 20 is that the pixel circuit 11 reads only one row of four-pixel units in each of four blocks of pixels (each block being of 8×8 pixels). Thus, the number of processes of reading the pixels in the row directions, and hence the time for reading of the pixels in the block of 16×16 pixels can be reduced to ¼ (quarter) of that in the all-pixel read mode.

As described in the foregoing, in the imaging device 100 according to any one of the First, Second and Third Embodiments, adjacent pixels use an amplifying transistor MSF, a reset switch MRES and a selection switch MSEL in common, so that the imaging device 100 can be simplified in structure and reduced in manufacturing cost. Further, in contrast to the imaging device e.g. in FIG. 1 (Prior art), it is not necessary to provide two capacitances and two transfer switches in one pixel, thereby enabling a simpler structure and further reduction of manufacturing cost.

Furthermore, in the pixel circuit 11 of the imaging device 100 in high brightness mode, not only the photodiodes of pixels removed or discarded by downsampling, but also the capacitance CFD are used as capacitances for storing signal charges transferred from the transfer switches. Accordingly, it is possible to lower the gate voltage applied to the amplifying transistor MSF to reduce the sensitivity of the pixels and hence of the pixel circuit, thereby reducing the occurrence of flicker as compared with the case of using only the capacitance CFD as a capacitance for storing signal charges transferred from the transfer switches.

In addition, in the high brightness mode, the reset level of each pixel to read a signal from is read by sequentially turning on and off the reset switch MRES and the selection switch MSEL while the transfer switch of each pixel to be discarded is turned on. Further, the signal level of each pixel to read a signal from is read by sequentially turning on and off the transfer switch of the each pixel to read a signal from and the selection switch MSEL while the transfer switch of the each pixel to be discarded is maintained in the on-state. Thus, only by changing the method of driving the pixel circuit 11 without adding a new structure, the sensitivity of the pixels and hence of the pixel circuit 11 can be reduced so as to be adapted to the brightness of an image received by the pixel circuit 11, thereby enabling the reduction of occurrence of flicker with a simple structure of the imaging device.

It is to be noted that the imaging device according to the present invention is not limited to the imaging device 100 according to one of the above First to Third Embodiments, and can be modified only if adjacent pixels use an amplifying transistor MSF, a reset switch MRES and a selection switch MSEL in common, and if a photodiode of each pixel to be discarded is used in addition to a capacitance CFD as capacitances for storing signal charges transferred from transfer switches.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

This application is based on Japanese patent application 2005-312867 filed Oct. 27, 2005, the content of which is hereby incorporated by reference.

What is claimed is:

1. An imaging device comprising:
a pixel circuit comprising: multiple pixels each having a photoelectric conversion unit and transfer means for transferring signal charges output from the photoelectric conversion units; capacitance means for storing the signal charges transferred from the transfer means; signal amplifying means for amplifying and outputting signals corresponding to the signal charges stored in the capacitance means; reset means for resetting the signal charges stored in the capacitance means; and pixel selection means for selecting each pixel to read a signal from,
wherein the imaging device has an all-pixel read mode for reading signals from all the pixels and a pixel downsampling read mode for reading signals of pixels by discarding the others,
wherein adjacent ones of the pixels use the capacitance means, the signal amplifying means, the reset means and the pixel selection means in common, and
wherein in the pixel downsampling read mode, not only the capacitance means but also the photoelectric conversion units of pixels to be discarded are used as capacitances for storing the signal charges transferred from the transfer means so as to lower voltage applied to the signal amplifying means as compared with the case of using only the capacitance means as a capacitance for storing signal charges transferred from the transfer means, thereby reducing sensitivity of the pixels.

2. The imaging device according to claim 1, wherein the reset means and the pixel selection means are sequentially turned on and off with the transfer means of the pixels to be discarded being turned on so as to read a reset level of each pixel to read a signal from, while the transfer means of each pixel to read a signal from and the pixel selection means are sequentially turned on and off with the transfer means of the pixels to be discarded being maintained in on-state so as to read a signal level of each pixel to read a signal from.

3. The imaging device according to claim 2,
wherein the imaging device further comprises brightness determination means for determining whether or not the brightness of an image received by the imaging device exceeds a predetermined threshold value which is set so that at the predetermined threshold value, a charge accumulation time of each photoelectric conversion unit is equal to or shorter than ½ period of a commercial power supply,
wherein the pixel downsampling read mode has: a normal brightness mode to drive the pixel circuit with a normal sensitivity setting if the brightness determination means determines that the brightness of an image received by the imaging device is equal to or lower than the threshold value; and a high brightness mode to drive the pixel circuit with a low sensitivity setting lower than the normal sensitivity setting if the brightness determination means determines that the brightness of the image received by the imaging device exceeds the threshold value, and
wherein in the high brightness mode, the reset means and the pixel selection means are sequentially turned on and off with the transfer means of the pixels to be discarded being turned on so as to read a reset level of each pixel to read a signal from, while the transfer means of each pixel to read a signal from and the pixel selection means are sequentially turned on and off with the transfer means of the pixels to be discarded being maintained in on-state so as to read a signal level of each pixel to read a signal from.

* * * * *